(12) United States Patent
Miranda

(10) Patent No.: US 10,049,402 B1
(45) Date of Patent: Aug. 14, 2018

(54) ATM PRIVACY SYSTEM AND METHOD

(75) Inventor: Giancarlo Miranda, Columbus, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 756 days.

(21) Appl. No.: 13/495,145

(22) Filed: Jun. 13, 2012

(51) Int. Cl.
*G06Q 40/00* (2012.01)
*G06Q 20/10* (2012.01)
*G06Q 20/40* (2012.01)
*G06Q 20/42* (2012.01)

(52) U.S. Cl.
CPC ......... *G06Q 40/00* (2013.01); *G06Q 20/1085* (2013.01); *G06Q 20/40* (2013.01); *G06Q 20/42* (2013.01)

(58) Field of Classification Search
CPC .................................................. G06Q 40/00
USPC .................................................... 705/35–45
See application file for complete search history.

(56) References Cited

U.S. PATENT DOCUMENTS

| | | | |
|---|---|---|---|
| 3,653,480 A | 4/1972 | Yamamoto et al. | |
| D263,344 S | 3/1982 | McCarthy et al. | |
| 4,454,414 A | 6/1984 | Benton | |
| 4,617,457 A | 10/1986 | Granzow | |
| 4,817,949 A | 4/1989 | Bachman et al. | |
| 5,025,139 A | 6/1991 | Halliburton, Jr. | |
| 5,050,207 A | 9/1991 | Hitchcock | |
| 5,052,373 A | 10/1991 | Michelson | |
| 5,157,717 A | 10/1992 | Hitchcock | |
| 5,220,501 A | 6/1993 | Lawlor et al. | |
| 5,265,033 A | 11/1993 | Vajk et al. | |
| 5,326,960 A | 7/1994 | Tannenbaum | |
| 5,350,906 A | 9/1994 | Brody et al. | |
| 5,465,206 A | 11/1995 | Hilt et al. | |
| 5,473,143 A | 12/1995 | Vak et al. | |
| 5,477,038 A | 12/1995 | Levine et al. | |
| 5,482,139 A | 1/1996 | Rivalto | |
| 5,570,465 A | 10/1996 | Tsakanikas | |
| 5,588,274 A | 12/1996 | Lange | |
| 5,619,558 A | 4/1997 | Jheeta | |
| 5,649,118 A | 7/1997 | Carlisle et al. | |
| 5,650,604 A | 7/1997 | Marcous et al. | |
| 5,684,291 A | 11/1997 | Taskett | |

(Continued)

FOREIGN PATENT DOCUMENTS

| | | |
|---|---|---|
| CA | 2293321 | 12/1998 |
| CA | 2430549 | 6/2002 |

*Primary Examiner* — Hai Tran
(74) *Attorney, Agent, or Firm* — LeClairRyan PLLC

(57) ABSTRACT

Embodiments of the invention are related generally to systems and methods for providing increased security at Automated Teller Machines ("ATMs") through the use of "smart glass" barriers. The system provides for increased security at ATMs by decreasing the transparency in glass panels which partially or completely enclose an ATM. In the present invention, a change in electrical current is delivered to the glass panel. The change in electrical current functions to decrease the transparency of the transparent glass panel, at least partially restricting the view of the user at the automated teller machine. Thus, the user may securely complete the transaction. In embodiments of the invention, the interior and exterior sides of the glass panels may also function as a high definition projection screens, and may be used to present displays to the user and/or to others.

16 Claims, 5 Drawing Sheets

(56) References Cited

U.S. PATENT DOCUMENTS

| | | |
|---|---|---|
| 5,751,842 A | 5/1998 | Riach et al. |
| 5,764,789 A | 6/1998 | Pare, Jr. et al. |
| 5,799,288 A | 8/1998 | Tanaka et al. |
| 5,866,889 A | 2/1999 | Weiss et al. |
| 5,870,724 A | 2/1999 | Lawlor et al. |
| 5,915,246 A | 6/1999 | Patterson et al. |
| 5,933,816 A | 8/1999 | Zeanah et al. |
| 5,952,639 A | 9/1999 | Ohki et al. |
| 5,955,961 A | 9/1999 | Wallerstein |
| 5,956,700 A | 9/1999 | Landry |
| 5,963,647 A | 10/1999 | Downing et al. |
| RE36,365 E | 11/1999 | Levine et al. |
| 5,987,439 A | 11/1999 | Gustin et al. |
| 6,006,988 A | 12/1999 | Behrmann et al. |
| 6,016,476 A | 1/2000 | Maes et al. |
| 6,029,890 A | 2/2000 | Austin |
| 6,032,859 A | 3/2000 | Muehlberger et al. |
| 6,038,553 A | 3/2000 | Hyde, Jr. |
| 6,098,053 A | 8/2000 | Slater |
| 6,105,009 A | 8/2000 | Cuervo |
| 6,105,011 A | 8/2000 | Morrison, Jr. |
| 6,111,858 A | 8/2000 | Greaves et al. |
| 6,112,191 A | 8/2000 | Burke |
| 6,128,598 A | 10/2000 | Walker et al. |
| 6,130,623 A | 10/2000 | MacLellan et al. |
| 6,131,810 A | 10/2000 | Weiss et al. |
| 6,149,055 A | 11/2000 | Gatto |
| 6,154,879 A | 11/2000 | Pare, Jr. et al. |
| 6,202,054 B1 | 3/2001 | Lawlor et al. |
| RE37,122 E | 4/2001 | Levine et al. |
| 6,308,887 B1 | 10/2001 | Korman et al. |
| 6,318,536 B1 | 11/2001 | Korman et al. |
| 6,338,048 B1 | 1/2002 | Mori |
| 6,349,972 B1 | 2/2002 | Geiger et al. |
| 6,450,407 B1 | 9/2002 | Freeman et al. |
| 6,454,647 B1 | 9/2002 | Woodbury, Jr. |
| 6,473,500 B1 | 10/2002 | Risafi et al. |
| 6,476,830 B1 | 11/2002 | Farmer et al. |
| 6,536,663 B1 | 3/2003 | Lozier et al. |
| 6,554,185 B1 | 4/2003 | Montross et al. |
| 6,581,839 B1 | 6/2003 | Lasch et al. |
| RE38,255 E | 9/2003 | Levine et al. |
| 6,749,123 B2 | 6/2004 | Lasch et al. |
| 6,764,014 B2 | 7/2004 | Lasch et al. |
| 6,769,605 B1 | 8/2004 | Magness |
| 6,796,490 B1 | 9/2004 | Drummond et al. |
| 6,860,375 B2 | 3/2005 | Hallowell et al. |
| 6,895,386 B1 | 5/2005 | Bachman et al. |
| 6,942,569 B2 | 9/2005 | Petracca |
| 7,025,256 B1 | 4/2006 | Drummond et al. |
| 7,039,600 B1 | 5/2006 | Meek et al. |
| 7,040,533 B1 | 5/2006 | Ramachandran |
| 7,070,112 B2 | 7/2006 | Beenau et al. |
| 7,076,458 B2 | 7/2006 | Lawlor et al. |
| 7,080,036 B1 | 7/2006 | Drummond et al. |
| 7,150,393 B1 | 12/2006 | Drummond et al. |
| 7,252,226 B2 | 8/2007 | Risafi et al. |
| 7,395,241 B1 | 7/2008 | Cook et al. |
| 7,415,442 B1 | 8/2008 | Battaglini et al. |
| 7,607,583 B2 | 10/2009 | Berardi et al. |
| 7,693,790 B2 | 4/2010 | Lawlor et al. |
| 7,753,259 B1 | 7/2010 | Taylor et al. |
| 7,801,816 B2 | 9/2010 | Alarcon-Luther et al. |
| 8,640,946 B1 * | 2/2014 | Block ............... G06Q 20/1085 235/379 |
| 8,651,373 B1 * | 2/2014 | Block ............... G06Q 20/1085 235/379 |
| 2001/0037300 A1 | 11/2001 | Miyazaki et al. |
| 2001/0044747 A1 | 11/2001 | Ramachandran et al. |
| 2002/0052845 A1 | 5/2002 | Nielsen |
| 2002/0062285 A1 | 5/2002 | Amann et al. |
| 2002/0116330 A1 | 8/2002 | Hed et al. |
| 2002/0133461 A1 | 9/2002 | Ramachandran |
| 2002/0153415 A1 | 10/2002 | Minami et al. |
| 2002/0174016 A1 | 11/2002 | Cuervo |
| 2003/0009426 A1 | 1/2003 | Ruiz-Sanchez |
| 2003/0028483 A1 | 2/2003 | Sanders et al. |
| 2003/0040959 A1 | 2/2003 | Fei et al. |
| 2003/0075610 A1 | 4/2003 | Ong |
| 2003/0105714 A1 | 6/2003 | Alarcon-Luther et al. |
| 2003/0182194 A1 | 9/2003 | Choey et al. |
| 2003/0200180 A1 | 10/2003 | Phelan, III et al. |
| 2003/0208439 A1 | 11/2003 | Rast |
| 2003/0217005 A1 | 11/2003 | Drummond et al. |
| 2003/0218066 A1 | 11/2003 | Fernandes et al. |
| 2004/0010462 A1 | 1/2004 | Moon et al. |
| 2004/0117300 A1 | 6/2004 | Jones et al. |
| 2004/0118930 A1 | 6/2004 | Berardi et al. |
| 2005/0040242 A1 | 2/2005 | Beenau et al. |
| 2005/0065877 A1 | 3/2005 | Cleary et al. |
| 2005/0167488 A1 | 8/2005 | Higgins et al. |
| 2005/0216888 A1 | 9/2005 | Drummond et al. |
| 2005/0273387 A1 | 12/2005 | Previdi |
| 2006/0016884 A1 * | 1/2006 | Block ............... G06K 19/08 235/381 |
| 2006/0131408 A1 | 6/2006 | McNamara |
| 2007/0131759 A1 | 6/2007 | Cox et al. |
| 2007/0168265 A1 | 7/2007 | Rosenberger |
| 2007/0203850 A1 | 8/2007 | Singh et al. |
| 2009/0043651 A1 | 2/2009 | Schwarz, Jr. |
| 2009/0313106 A1 | 12/2009 | Taylor et al. |
| 2011/0316828 A1 | 12/2011 | Shirbabadi |

* cited by examiner

ATM PRIVACY SYSTEM AND METHOD

TECHNICAL FIELD

Embodiments of the invention are related generally to systems and methods for providing increased security at Automated Teller Machines ("ATMs") through the use of "smart glass" barriers.

BACKGROUND OF THE INVENTION

Customers have expressed concerns related to both security and lack of privacy at ATMs. When entering information into an ATM, if not adequately protected, customers risk having their personal information, such as their Personal Identification Number ("PIN"), account numbers, account balance or other info' nation compromised. Oftentimes, the machines offer no privacy and no way of protecting the ATM user's information. Accordingly, when using such a system, anyone in the vicinity would be able to discern a user's account balance from the screen, or hear the various tones emitted by the keypad as the user inputs his or her four-digit PIN. Even where a rudimentary barrier is provided, this offers only minimal incremental privacy to the user, as such barriers typically offer very limited visual coverage, and further, verbal prompts and other sounds are still audible to others nearby.

In recent years, technologies have become available that allow for selective glazing by altering light transmission properties of glass based on a detected change in current. Although this technology is referred to generally herein as "smart glass," glass having this capability is also known as "electrochromic glass," "smart glass," "EGlass," "electric frosted glass" or "switchable glass." A further alternative includes a switchable smart film that may be adhered to glass. The film itself changes its light transmission properties based on the presence or absence of a current. The film is also capable of transforming into a high definition projection screen to display images and videos.

Accordingly, a solution is needed that will enhance customer security and privacy at ATMs. The solution should offer the user full visual coverage, and could also provide additional forms of security (i.e., protection of sounds, account verification, etc.). The user can then rest assured that, no matter the time or place of the transaction, the user information and transaction itself are fully protected.

BRIEF SUMMARY OF THE INVENTION

In accordance with exemplary embodiments of the present invention, there is provided a system for offering privacy to a user of an automated teller machine operated by a financial institution, the system comprising: an automated teller machine, further comprising a processor capable of accessing information about the user and an account access device for identifying the user and associating the user with a financial account; at least one glass panel positioned to at least partially obstruct the view of the user of the automated teller machine, the at least one glass panel comprising an interior surface oriented toward the automated teller machine, and an exterior surface oriented away from the automated teller machine, wherein a change in electrical current is delivered to the at least one glass panel, the change in electrical current being operable to decrease the transparency of the at least one transparent glass panel, the decreased transparency of the at least one glass panel at least partially restricting the view of the automated teller machine through the at least one glass panel.

In a further aspect of the invention, a method offers privacy to a user of an automated teller machine operated by a financial institution, the automated teller machine including at least one glass panel positioned to at least partially obstruct the view of the user of the automated teller machine, the at least one glass panel comprising an interior surface oriented toward the automated teller machine and an exterior surface oriented away from the automated teller machine, the method comprising: identifying the user associated with a financial account at the automated teller machine; accessing information about the user via a processor associated with the automated teller machine, the processor being further configured to include a current application module; applying, at the command of the current application module, a change in electrical current to the at least one glass panel, the change in electrical current being operable to decrease the transparency of the at least one transparent glass panel; and at least partially restricting, through the decreased transparency, the view of the automated teller machine through the at least one glass panel.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to systems and methods for providing for increased security at Automated Teller Machines ("ATMs") through the use of "smart glass" barriers and/or switchable smart film that may be adhered to glass. In embodiments of the invention, an ATM is partially or completely enclosed by one or more glass panels, where the opacity of the glass panels may be increased or decreased by application (or removal) of an electrical current. For example, the ATM may have side panels constructed of the glass (forming a partition), or the glass may be configured to form a rear enclosure or an entire enclosure for the ATM (forming a booth). The particular enclosure may depend on the location of the ATM and the relative perception of security and/or privacy concerns in that area.

Figure 1:
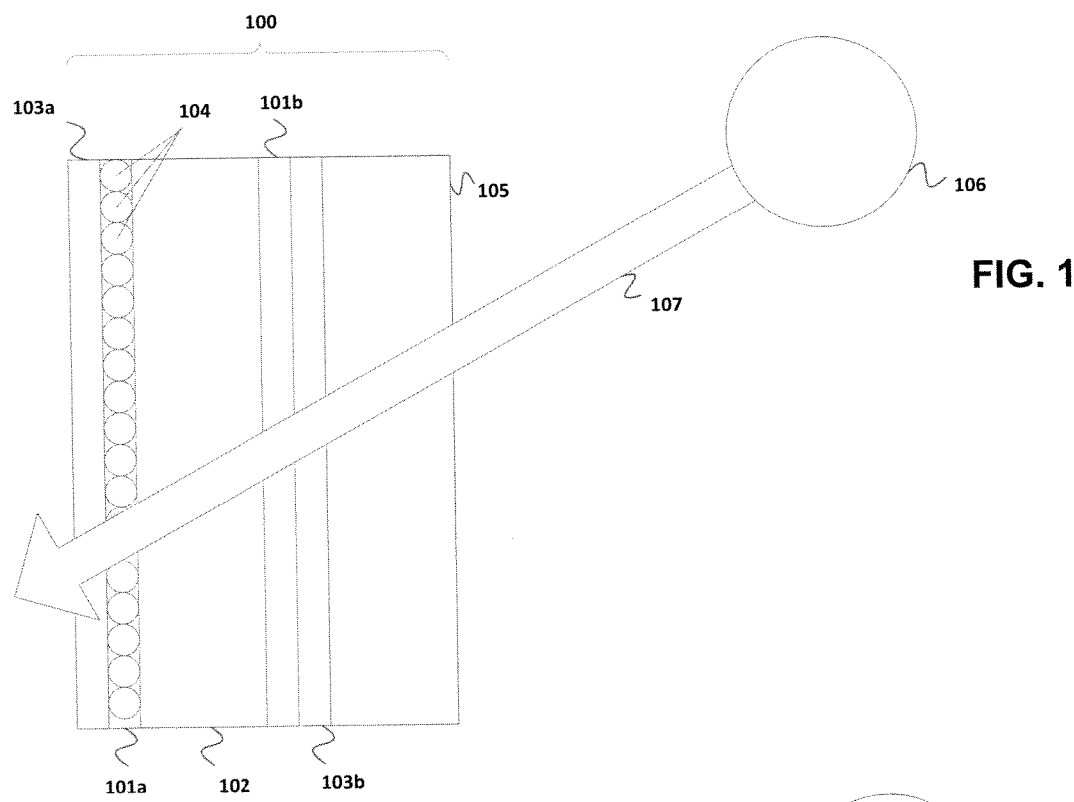
FIG. 1 is a diagram illustrating the manner in which light particles pass through an exemplary electrochromic glass panel, where an electric current is not being applied, in accordance with an embodiment of the invention.
Figure 2:
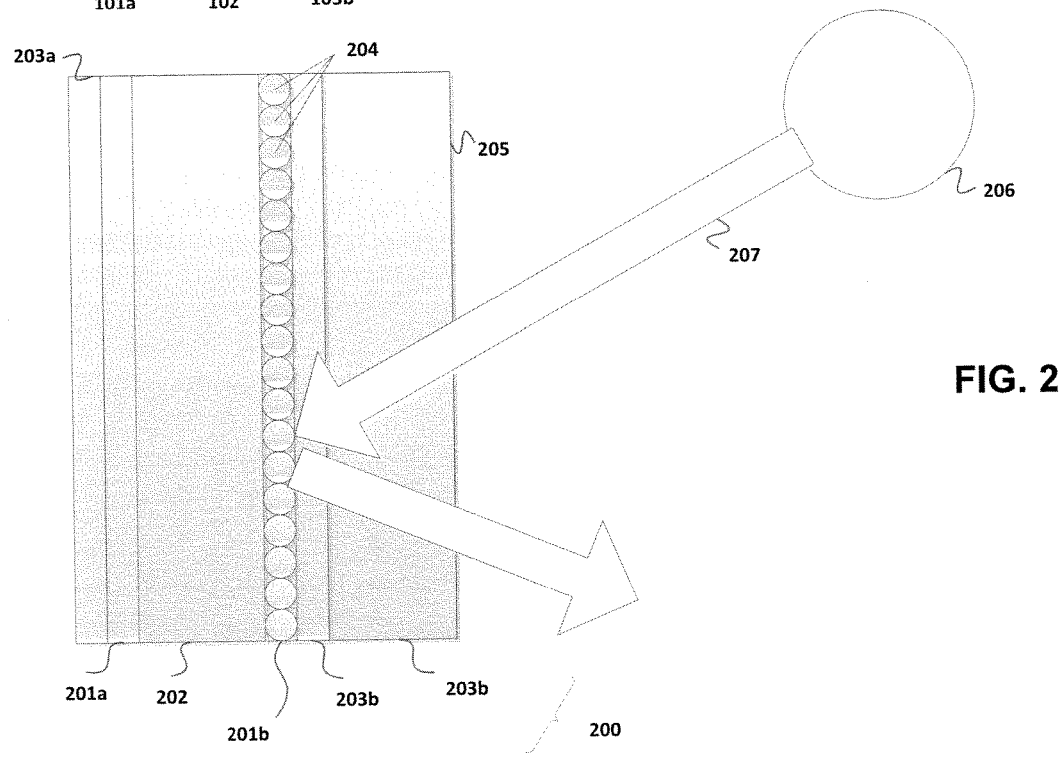
FIG. 2 is a diagram illustrating the manner in which light particles are scattered by electrochromic glass panel once an electric current has been applied, in accordance with an embodiment of the invention.

Generally, electrochromic devices change light transmission properties in response to voltage and thus allow control over the amount of light and heat passing through a medium. FIG. 1 illustrates the manner in which light particles pass through an exemplary electrochromic glass panel, where voltage is not being applied. In an embodiment of the invention, an electrochromic panel 100 may consist of at least five thin layers: two electrodes (101a, 101b) on either side of a separator/ion conducting layer 102, and then two transparent electrical contact layers, or conductors, (103a, 103b) on either side of the electrodes. When no current is being passed through the glass, ions 104 (often, hydrogen or lithium ions) reside in an ion storage layer (not pictured) near electrode 101a, away from the exterior side 105 of the panel 100 facing the light source 106. In this case, the glass 100 remains clear and light particles 107 are able to pass through. As shown in FIG. 2, however, when a certain level of voltage is applied to electrodes 201a and 201b, the ions 204 migrate from the ion storage layer (not pictured), through the separator/ion conducting layer 202, to an electrochemical layer (not pictured) closer to the outermost electrode 201b. In some embodiments, the electrochemical layer may consist of tungsten oxide ($WO_3$). Now closer to the exterior side 205 of panel 200, which faces the light source 206, the ions 204 scatter away most of the incoming light particles 207. The presence of the ions 204 in the electrochromic layer changes the optical properties of the glass 200, causing it to absorb visible light emitted from light source 206, giving the appearance that the glass 200 is opaque or dark. When the voltage is reversed, the ions 204 are driven in the opposite direction, out of the electrochromic layer, through the ion conducting layer, and into the ion storage layer. As the ions 204 migrate out of the electrochromic layer, back into the configuration shown and described in FIG. 1, the glass 200 lightens and becomes transparent again.

Those skilled in the art will also appreciate that further alternatives exist and provide additional methods and systems for modifying the opacity and/or transparency of glass. For instance, modified porous nano-crystalline films coffer another method for creating a "smart glass" panel. In one embodiment of the invention, the opacity of glass may be modified through the use of suspended particle devices ("SPDs"), a thin film laminate of rod-like particles suspended in a fluid and placed between two glass or plastic layers, or attached to one layer. When no voltage is applied, the suspended particles are arranged in random orientations and tend to absorb light, so that the glass panel appears opaque. When voltage is applied, the suspended particles align and allow light to pass through. Thus, unlike the electrochromic glass described above, SPDs become opaque in the absence of a current. SPDs can be manually or automatically "tuned" to precisely control the amount of light, glare and heat passing through a medium such as glass.

Still another method for modifying the opacity of glass is through the use of polymer dispersed liquid crystal devices ("PDLCs"). Like SPDs, PDLCs also become opaque in the absence of a current. In this process, liquid crystals are dissolved or dispersed into a liquid polymer followed by solidification or curing of the polymer. During the change of the polymer from a liquid to solid, the liquid crystals become incompatible with the solid polymer and form droplets throughout the solid polymer. Typically, the liquid mix of polymer and liquid crystals is placed in a capacitor structure; for example, the mixture may be placed between two layers of glass or plastic that include a thin layer of a transparent, conductive material followed by curing of the polymer.

In one example of a PDLC setup, electrodes from a power supply are attached to the transparent electrodes. When no voltage is being applied, the PDLC window has a translucent, "milky white" appearance, due to the random arrangement of the liquid crystals in the droplets, which results in scattering of light as it passes through the smart window assembly. When a voltage is applied to the electrodes, the electric field formed between the two transparent electrodes on the glass causes the liquid crystals to align, allowing light to pass through the droplets with very little scattering and resulting in a transparent state. In a PDLC setup, the degree of transparency can also be controlled by the applied voltage. This is possible because at lower voltages, only a few of the liquid crystals align completely in the electric field, so only a small portion of the light passes through while most of the light is scattered. As the voltage is increased, fewer liquid crystals remain out of alignment, resulting in less light being scattered. It is also possible to control the amount of light and heat passing through, when tints and special inner layers are used.

One specific application of PDLC technology is the use of a switchable smart film that may be adhered to glass. The film itself changes its light transmission properties based on a change in electrical current, and is also capable of transforming into a high definition rear projection screen to display images and videos. In its frosted state, the film acts as an electronic blind providing privacy and security for any glass, window or partition. The film is commercially available and can typically be customized to any size. Custom shapes and sizes are available and multiple pieces can be joined together to create large switchable glazed panels or partitions.

As noted above, these technologies may be used to provide a partial or complete enclosure of an ATM. In an embodiment of the invention, if the glass panels surrounding the ATM are covered by a switchable smart film (or by any other comparable technology), the glass panels may also be configured to provide messaging to the current user of the ATM and/or to others not currently using the ATM, but who are nearby (e.g., those waiting in line to use the ATM, passers-by, etc.). It will be appreciated by those skilled in the art that systems and methods for modifying the opacity of glass, and for using "smart glass" panels as a high-definition projection screen, may be used separately or in conjunction so that similar, complementary, and/or different images may be displayed on both the interior and exterior of the booth. Messages intended for the current user of the ATM may be referred to herein as "interior messages," or "interior displays," and may suggest the use of pictures, displays, videos, graphics, etc. appearing on the interior portions of the glass, which would further be visible only by the current user of the ATM. For example, if a transaction is in progress, the interior messaging directed at the customer may be an advertisement for the financial institution associated with the ATM. In an embodiment of the invention, interior messages could be tailored to the identity of the user and/or the location of the ATM. In another example, if the customer is using a card that is associated with a competing financial institution, the user may be shown an internal display comparing interest rates between the financial institution associated with the ATM, and the financial institution associated with the user's card.

In an exemplary embodiment of the invention, the display may be tailored to the user based on the type of card inserted into the card reader and/or based on a manually entered account number, contact list card, mobile phone data, RFID device, biometric data, or any other identification device and/or data. In embodiments of the invention, the user is identified by an account access device, such as, for instance, a card reader; however, those skilled in the art will understand that a user may be identified using any of the devices and/or data described herein (but not limited to such devices and/or data), and the account access device may also be, for instance, a keypad, RFID receiver, biometric scanner, and so on. In one such embodiment of the present invention, the interior messages may be generated based on a user's presentation of a co-branded or affinity card at the ATM. For instance, in an exemplary embodiment, a partnered airline card may generate a display with offers associated with the airline. In this instance, the interior display may also indicate whether the user is eligible for certain upgrades or promotions currently being offered by the airline. In another exemplary embodiment, if the user inserts a co-branded Walt Disney World card into an ATM, the interior glass may display cartoons and images of Disney characters, as well as the weather forecast in Orlando, Fla. In another exemplary embodiment, a user presenting a co-branded Washington Redskins affinity card may be shown a highlight clip of a recent game, or may be presented with information regarding an upcoming event for season ticketholders.

Figure 3:
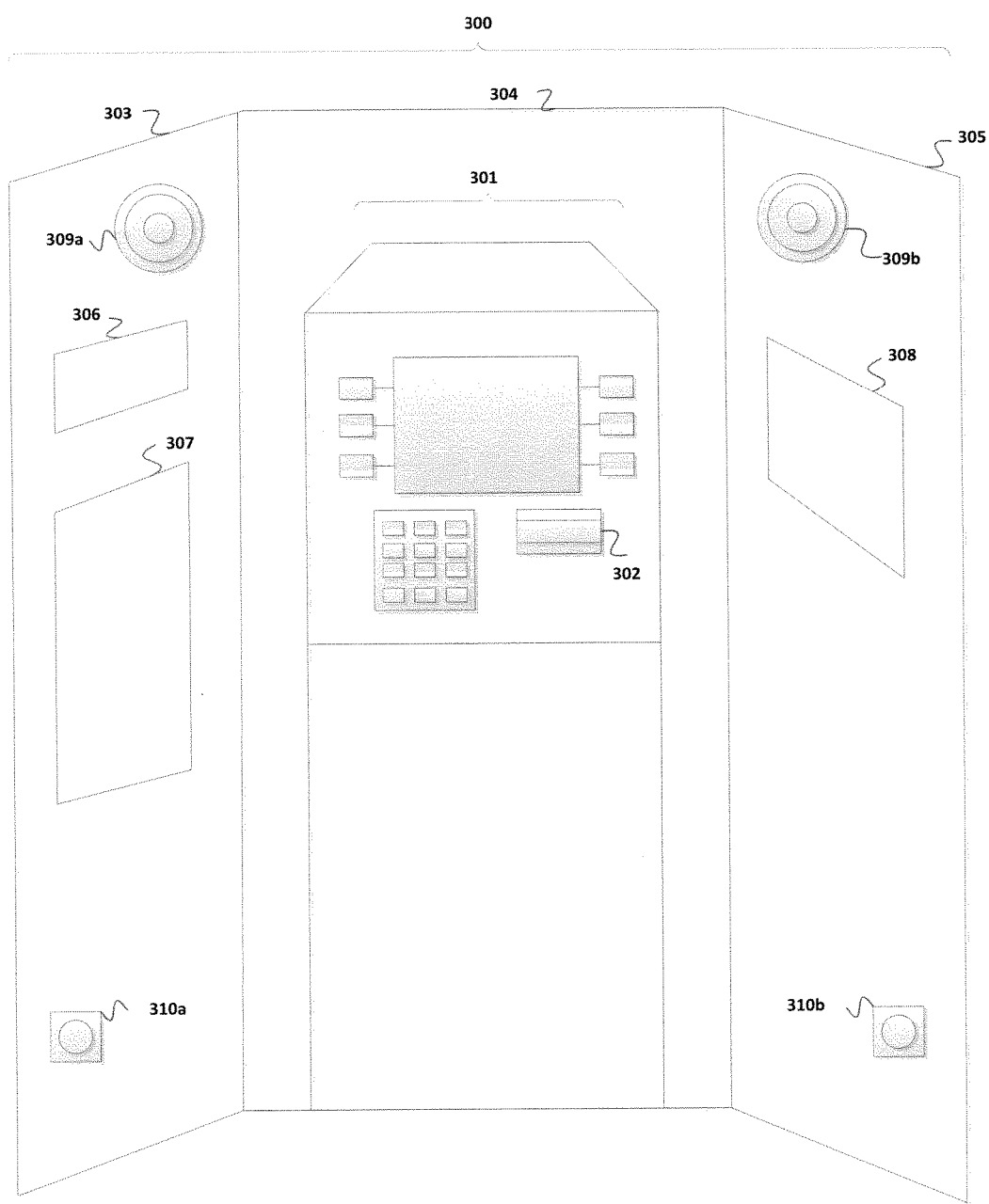
FIG. 3 is a diagram illustrating a front view of a secure ATM with a "smart glass" barrier, in accordance with an embodiment of the invention.

One example of an ATM partially surrounded by "smart glass," and configured for interior messaging is illustrated in FIG. 3. As noted above, the ATM 301 itself may be surrounded at least partially by "smart glass" panels and/or smart film projection screens on the glass panels. In one embodiment of the invention, the user is protected by three glass panels: a left side panel 303, a right side panel 305, and a rear central panel 304. In an embodiment of the invention, there may also be a fourth panel so that the ATM 301 is completely enclosed within a booth. In other embodiments of the invention, only one rear and one side panel may be necessary to provide the user with sufficient privacy (for instance, where the ATM 301 is positioned against a wall). Those skilled in the art will recognize that, in the embodiment of the invention shown and described in FIG. 3, "smart glass" panels are used to surround the ATM, and will completely obscure any vantage into the booth from the exterior.

Once a user has initiated a transaction at ATM 301, activation of the glass panels 303-305 may occur in one or more ways. For example, the ATM 301 may include a card reader 302 which is associated with a user account as previously described. In an exemplary embodiment, the insertion of a card into card reader 302 may be linked to a switch (not pictured) that operates to interrupt or generate electric current. In embodiments of the invention, the card reader may be any account access device capable of identifying a user. In another embodiment of the invention, a charge is applied or removed from the glass panels through the use of a wire. The insertion of a card into the card reader 302 may also be used to discontinue the current and activate the smart film on the glass, in embodiments where smart film is being used. Proximity sensors 310a-b may additionally or alternatively be used to perform this function as well. In an embodiment of the invention, the user may simply flip a switch (which may, for instance, be configured to look like a typical light switch) once he or she enters the booth, and the switch may operate to interrupt or generate electric current.

In embodiments of the invention, as shown and described in FIG. 3, projection screens 306-307 and 308 are located on side panels 303 and 305. In other embodiments of the invention, there may be a number of different configurations based on the size and placements of the various screens. Although not explicitly shown, in one exemplary embodiment, a screen may also be placed on rear central panel 304.

In an embodiment of the invention, the exterior side of the glass panel will appear opaque or cloudy while the user is able to view images and/or other displays on the projection screen. In other embodiments of the invention, different images will appear on both the interior and exterior sides of the glass panels. Further, in one embodiment of the invention, side panels 303 and 305 may be equipped with speakers 309a-b for the purposes of providing a user customization experience, as well as providing additional user security, as discussed herein.

The fact that glass panels 303-305 may be configured to remain at least partially transparent when a transaction is not in process both allows user to discern that (a) there is an ATM 301 nearby, and (b) that ATM 301 is currently available for use. This feature may also have applicability in financial institutions or financial institution branches which implement "drive-through" ATMs and/or other banking services. Those skilled in the art will also appreciate that the invention as described herein may be applicable to banks of ATMs. In certain markets or locations, financial institutions are known to offer small, glass-enclosed rooms with multiple ATMs, sometimes accessible only by users presenting a card associated with the appropriate financial institution. However, users of these machines face similar obstacles to maintaining privacy during a transaction, because the glass is transparent at all times and typically, the rooms are not soundproofed.

In an embodiment of the invention, booth 300 may also be designed to utilize proximity sensors 310a-b, or any other device which emits an electromagnetic field or a beam of electromagnetic radiation and is capable of sensing changes in the field or return signal. As previously noted, the proximity sensors may be used to activate a change in current required for an increase and/or decrease in opacity. In an embodiment of the invention, when a child has accompanied an adult user into a booth, proximity sensors 310a-b may be implemented to detect the presence of children based on height. In this exemplary embodiment, the side glass panels 303, 305 may be activated to display information to occupy children during the transaction, such as cartoons or other images displayed on the lower portion of the glass.

In an embodiment of the invention, proximity sensors 310a-b may also be utilized to detect the number of users occupying the interior of the setup 300. Thus, additional features for multiple users may be activated. For instance, screen 306, outfitted with a small camera (not pictured), may turn the HD projection into a live video feed. The feed may be configured to capture a "snapshot" of the customers in the booth. In an embodiment of the invention, the screen may offer to send the digital image of the users to at least one of the user's mobile devices, either for a fee or at no charge. In an exemplary embodiment, this would require, for instance, that the user input his or her mobile phone number into the ATM Encrypting PIN Pad. In one embodiment, the picture could be assigned an alphanumeric code, and the user would be required to text the alphanumeric code to a dedicated phone number in order to receive the image via text message. In other embodiments of the invention, the small camera could be outfitted to collect video or snapshots continuously throughout the day. This feature may also offer significant safety advantages to a user of an ATM; for instance, it may be advantageous in many circumstances to have a high definition image of a user of an ATM at a specific time or on a specific day (e.g., when tracking an identity theft).

It will be further appreciated by those skilled in the art that the glass panels surrounding the ATM need not be rectangular. Rather, the glass panels themselves may be configured to appear in a number of different shapes, and may be so designed based on practical or aesthetic reasons (or some combination thereof). For instance, in some embodiments, it may be desirable for the ATM to be surrounded by a cylindrical booth. In other embodiments, the booth may be designed in a pyramid (triangular) shape. Other, less common shapes (such as pentagonal or hexagonal), may also be desirable in particular circumstances. In some embodiments of the invention, the shape of the booth may be prescribed based on its location: for instance, it may be desirable to have an ATM located near a metropolitan modern art museum configured in an unusual or unique shape, while a more traditional, rectangular ATM booth may appear in an historical downtown area.

In additional or alternative embodiments of the invention, the interior display may also be tailored to the user based on an account profile, stored user profile, or through any other method of customization. Those skilled in the art will also appreciate the numerous possibilities for account customization described herein are exemplary, and that many other examples or possibilities for customization exist beyond those explicitly described herein. For instance, in an embodiment of the invention, where the user is a customer of the same financial institution that owns and operates the ATM, the customer profile may be built by the financial institution itself based on, for example, basic or otherwise known information about the customer. This information may include the customer's age, sex, marital status, customer spending habits, status level (e.g., a "platinum" customer). Those skilled in the art will appreciate that other basic information may be known and included as well. In an embodiment of the invention, custom settings may have been previously identified by the user and associated with a particular card, via, for instance, a secure, customer-accessible website hosted by (or otherwise associated with) the user's financial institution. Based on the user's custom profile, the interior side of the glass panels may provide weather for a particular location, sports news for specific teams or cities, or news alerts relating to a celebrity of interest. A user may also wish to see a list of his or her most recent transactions and/or a display showing the balance on the account. In a further example, a user may select and upload an identifying "profile picture" or other image to be displayed during transaction. This unique identifier may also be used to provide an additional measure of account security. In an additional or alternative embodiment of the present invention, users may wish to receive information about pre-selected points of interest (for instance, identifying nearby bars, gyms, food trucks, coffee shops, etc.) during a transaction. In addition, some users may also prefer that this information (or any other messaging) be displayed in another language, and may configure their stored user profile accordingly.

Those skilled in the art will appreciate that, in some instances, more elaborate user customization settings may be desirable. For instance, a projection screen may be used in combination with a virtual teller avatar (or any other image of a person) which may be used to interact with, and provide personal service to, the user. Those skilled in the art will appreciate that this would allow users access to a virtual teller avatar at any time of day. In an embodiment of the invention, the user may wish to indicate, on his stored user profile, a favorite television program or network. Upon being recognized at the ATM, the user may then be shown a brief clip of the selected program, or from a randomly selected program on the designated network, while the transaction is pending. In some instances, it may be desirable to execute this feature through a partnership with a video website such as HuLu™ or Youtube™. In another embodiment, the user may be notified of ongoing deals or sales that are within a certain predefined distance range of the ATM. In such an arrangement, it may be desirable for the financial institution which owns and/or operates the ATM to form a partnership with Groupon™, LivingSocial™ Dealfind™, MyChase, and/or other companies which offer widespread couponing deals to customers. Those skilled in the art will appreciate that this feature may be appropriately integrated with a feature for recognizing the time of day, day of the week, and/or seasonal weather. Thus, a customer completing an ATM transaction at noon on a Tuesday may be notified that a restaurant only two blocks away is currently offering a Groupon™ deal during lunch hours. In another example, a user completing a transaction on a Friday afternoon may be informed of a nearby spa offering a one-hour deep-tissue massage at a substantial discount through DealFinder™. In a further example, a user completing a transaction on a sunny Saturday morning may be informed of a local bike rental deal through LivingSocial™.

In one embodiment, the screens may operate as a way for ATM users to play an interactive trivia game. For example, once the user has indicated that he or she has completed his or her transaction(s), the projection screen may provide the user with a prompt asking if the user would like to try to answer a trivia question. In order to eliminate long wait times for other customers, it may be necessary to establish certain limitations. For example, in one embodiment, the trivia game may only be accessible to certain groups of users (e.g., users whose card is associated with the financial institution which owns and operates the ATM), or even a subset of that group (e.g., "gold" or "platinum" members only). In an embodiment of the invention, this feature may only be available for ATMs in low-traffic areas. In an exemplary embodiment, the appropriate users may be entitled to attempt to answer one trivia question which appears on the screen for a predetermined amount of time (for instance, 15 seconds). The user may select the answer by, for instance, pushing one of the 0-9 numbers on the ATM keypad or simply by touching the projection screen itself. In one embodiment, the user may be able to text the answer to a particular phone number. If the question is answered correctly, the user may then be rewarded with, for instance, credits or points which may be used toward services related to the financial institution (to be used towards fees usually associated with the account, for instance, overdraft fees), or towards any other rewards. In an embodiment of the invention, the points may be accumulated and used towards purchasing deals offered by Groupon' and/or other similar companies, and/or other partners of the financial institution. In an exemplary embodiment of the invention, ATMs within a predefined distance of one another may be networked together. When all machines within the predefined distance are in use, the time to complete the game may be shortened (or simply terminated all together). In an embodiment of the invention, this network may also be used to display the closest unoccupied ATMs on the exterior side of the glass panels, allowing the current user to play the trivia game as described, while directing waiting customers to an unoccupied machine in the area. This information may be displayed by a set of directions, by an image of a map, or in any other way that may be understood by a waiting customer.

Figure 4:
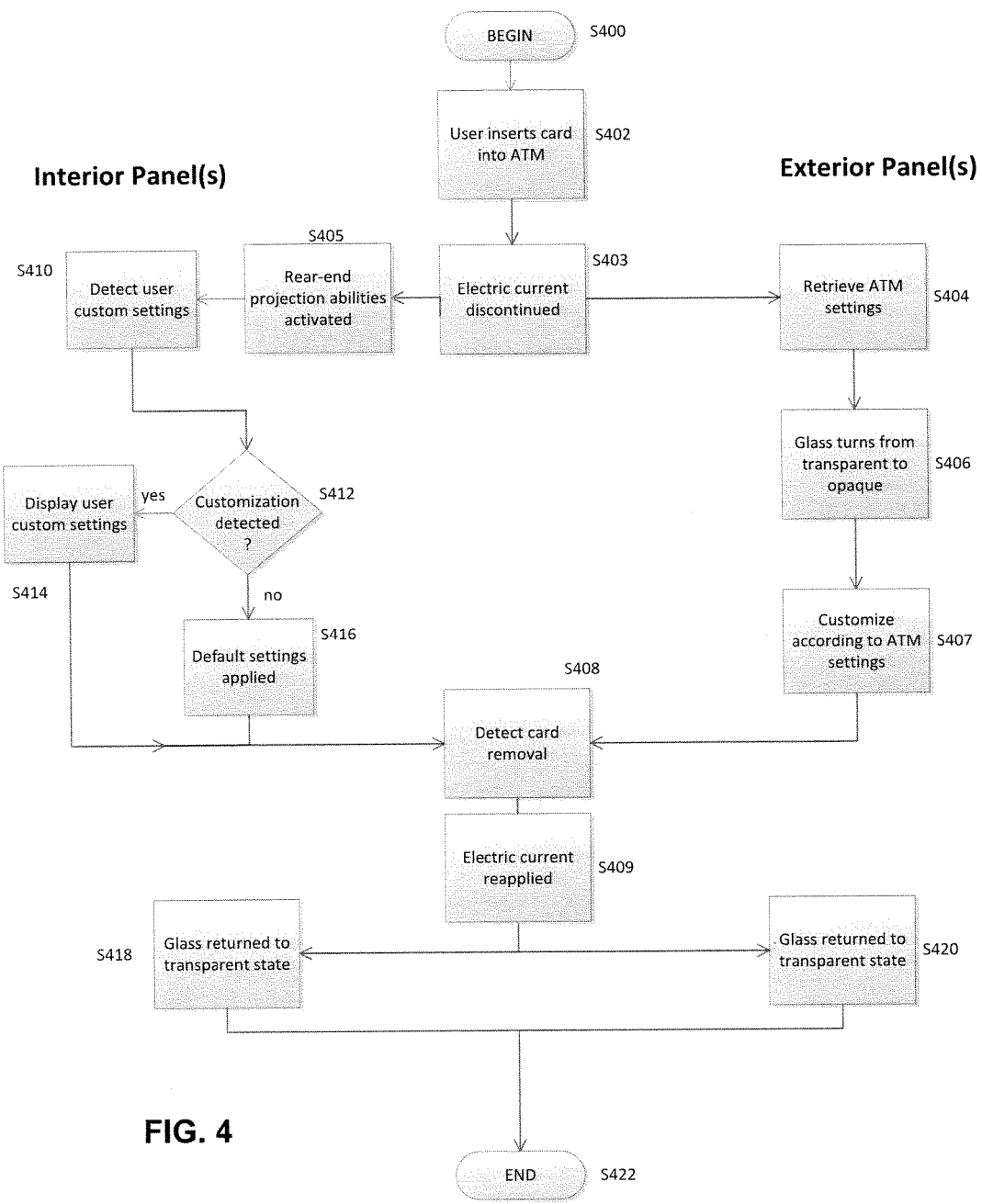
FIG. 4 is a flowchart illustrating the operation of the interior and exterior "smart glass" panels, in accordance with an embodiment of the invention.

One configuration of the invention is illustrated in exemplary FIG. 4. As a user approaches an unoccupied ATM, the glass barrier, covered in switchable smart film, may be completely transparent. However, in one embodiment of the invention, when the user inserts his or her credit card, debit card, or other financial instrument into the ATM (S402), an electric current may be immediately be disconnected from the glass panels surrounding the ATM (S403). Subsequently, settings specific to the ATM may be retrieved (S404). These settings may include, for example, information relating to the location of the ATM and/or default settings relating to the desired level of transparency of the exterior panels during the transaction, but may also be any other settings specific to the ATM itself. Meanwhile, in response to the absence of a current, the exterior portions of the switchable smart film will turn "cloudy" or "opaque," (S406) giving the user privacy to complete the transaction. In S407, the exterior panels may then be customized according to the ATM settings retrieved in S404.

Meanwhile, in this exemplary embodiment, the interior portions of the surrounding glass panels would be configured to operate as high-definition projection screens (S405), and to detect user custom settings (S410). These settings may have been previously identified by the user and associated with a particular card, via, for instance, a protected (but customer-accessible) website. In embodiments of the invention, as noted above, customization may be detected based simply on the use of a co-branded or affinity card. If user customization settings are detected, they may be displayed on the interior side of the glass panels would be visible only by the user (S414). If customization is not detected, default settings may be applied to the interior side of the glass panels (S416). In one embodiment, default settings may include, for example, a video advertisement or logo display for the financial institution associated with the ATM. More specifically, branch information, product rates and/or other information are exemplary of images that may be displayed as part of a default display. When the transaction is completed, the user so indicates and then retrieves his or her card (S408). When the current is reapplied (S409), the projections on the interior glass panels may then be restored to a transparent setting (S418) and the exterior panels will also return these panels to a transparent state (S420).

Those skilled in the art will appreciate that, in addition to the customization settings discussed above, the interior glass panels may further be configured with lights, speakers and/or other devices for emitting light, sounds and/or smells. This would allow, for instance, the user inserting a co-branded Walt Disney World card to hear music (e.g., "It's A Small World After All") during a transaction. In another exemplary embodiment, the holder of an affinity card associated with the user's alma mater may play the university's fight song while the user completes his or her transaction. In an embodiment of the invention, a user may select a song or song clip on the customer-accessible website as part of his or her stored user profile, which would then be played during the entirety of the user's transaction (similar to selecting a "ring tone" for a mobile telephone). Other embodiments noted above for instance, the selection of music and/or television shows as part of a user account—may specifically be created and applied to transactions where children are detected by the proximity sensors (e.g, parent may wish for "Sponge Bob Square Pants" theme song to play during transactions where children are with them and detected by the proximity sensors).

Besides enhancing the customer experience, customized sounds and music will provide additional security to the user by overpowering any sounds or commands emitted by the ATM during the transaction. Thus, even if a user does not wish to play music during the ATM transaction, white noise may still be projected for security purposes. Additionally, for ATMs in dark areas, additional light may be generated either by proximity sensors or once the user inserts the card into the machine, as customers may be uncomfortable when ATMs are not illuminated. To this end, it may also be desirable for booths to be outfitted with fiber-optic lights, which would project a "curtain" of light around the user and deter others from entering the space. Those skilled in the art will appreciate that any of the embodiments listed herein could further be accompanied by default or customized sound effects. Furthermore, the proximity sensors may also activate an alert for the user if the booth is entered during a transaction (a feature that may be implemented in conjunction with the use of the live camera feed discussed above); in addition, if a period of inactivity unexpectedly occurs, audio or video prompts may be generated to ask the customer if he or she requires assistance.

As noted above, in embodiments of the invention, the ATM may also be equipped with a device for causing a scent to be distributed, such as, for example, the smell of baking bread to advertise a bakery, a distinctive "new car" smell to advertise a car company, the smell of coffee to advertise the nearest Starbucks location or the smell of a new cologne to advertise a fragrance. Those skilled in the art will appreciate that it may be desirable to distribute other scents as well. This may be implemented by configuring a fan to distribute the desired scent (which may or may not need to be concentrated) either inside or outside the booth.

In addition to the exemplary embodiments listed above, the enclosed or partially enclosed booths may include other features as well. For instance, a self-cleaning feature may be added to the glass. Also, depending on the temperature, season and/or the location of the ATM, the booths may also include air-conditioning and/or heating.

As discussed briefly above, in addition, or in the alternative, to the embodiments described above, the exterior side of the glass panels may be used as a projection for messaging to individuals who are not using the ATM (referred to hereinafter as "exterior message(s)" or the "exterior display."). Exterior messaging may frequently be directed towards those waiting in line to use the ATM, to a desired target group (i.e., travelers, families, etc.), or simply to any possible passer-by. In an embodiment of the invention, the targeted groups may be specified by the ATM settings (S404), as shown and described in FIG. 4, and the customized exterior panels (S407) may be used to reflect the ATM's location or environment accordingly. For instance, for an ATM located near a tourist-heavy area of Washington, D.C., the location information may be stored and retrieved as an ATM setting. The exterior glass panels may be customized to display information that may be of interest to tourists, which might include, for instance, directions to the White House, a user-friendly transportation guide, and/or information relating to popular exhibits at a nearby Smithsonian museum. As previously noted, external messages may be the same as, or different from, the concurrently displayed internal messages. However, in many instances, it may be undesirable to display a user's selected customization information as exterior messaging. Specifically, if interior messages reveal any identifying information and/or personal data about the user, it may be particularly undesirable to display this information to anyone other than the user. However, with this exception, it should be noted that all of the interior messaging examples discussed herein may also be used as exterior messaging, and vice versa, in various embodiments of the invention.

In an embodiment of the invention, the screen may provide external messages to indicate whether the ATM is occupied or available. There may also be colored lighting to indicate when the ATM is in use (e.g., red) or available (e.g., green). To further increase efficiency, another colored light (e.g., yellow) may be used to indicate that the user of the transaction is near completion of the transaction, and that the ATM will be available shortly. In another embodiment, text displays may be used to communicate the occupancy of the booth ("Occupied," "Vacant," etc.). In an embodiment of the invention, when the ATM is occupied, different degrees of opacity may be implemented in order to indicate occupancy. For example, in one such embodiment, the glass may not be completely opaque while a transaction is in progress; rather, there will be just enough transparency to allow detection of whether someone is in the booth, but not to identify any features or other information.

Exterior messages may also be displayed that are pertinent to the location of the ATM in order to appeal to those waiting in line for ATM usage. For example, these exterior messages may include advertisements for local establishments, or other information relevant to the location of the ATM. For example, in an airport, the glass may display the departure and arrival schedules, and/or advertisements for restaurants in the airport. In the theatre district, the glass may display advertisements for plays, starting times, and ticket sales information. For ATMs in the middle of major metropolitan areas, traffic maps or reports may be displayed during established rush hours. In some instances, the exterior messaging may simply arise out of a desire to increase foot traffic around the area with the machine. For example, if there is a specific time of day when certain ATMs typically experience low usage, it may be desirable to display popular video clips, or breaking news, on the exterior screens. In general, these advertisements or displays may be static images or video.

In addition, one embodiment of the invention may be used in conjunction with social networking websites. For instance, it may be desirable to list the ATM locations on social networking sites such as Facebook™ and/or Foursquare™, and to allow users to "check in" and/or leave tips or comments about specific ATM locations. In another exemplary embodiment, a suggested "hashtag" for users of the social networking site Twitter™ (e.g., #BankX_Main-Street_ATM) may be prominently displayed on the exterior glass. In an embodiment of the invention, these settings may be enabled or promoted based on the interior glass as well, and may appear in response to the known age of the user/account-holder, and/or may be activated upon the detection of a mobile device.

In an embodiment of the invention, the ATM itself may operate as a social networking device. For instance, a user may be able to "check in" at the ATM location by, for instance, responding to prompts on the high definition screen, or by using the basic ATM user interface. A user who "checks in" with the requisite level of frequency (or within a specific time frame—for instance, at a time when ATM usage is routinely low) may become eligible for rewards and/or other benefits or prizes. For example, on a user's fifth visit to the ATM in one week, the user may become eligible to receive a free service at a specified branch location. It may be desirable to display a map or list of other ATM locations that users on the same account have transacted at recently. In addition, or alternatively, a user may wish to associate his or her Facebook™ account with his or her stored user account, and thus may choose to publish the user's "check-in" on his or her Facebook™ page. In an embodiment of the invention, a prompt ("Would you like to publish this check-in to your Facebook wall?") may be provided to the user who has chosen to associate his or her stored user account with a social networking account. In an embodiment of the invention, the prompt itself may offer an incentive to the user to check in or to publish a check-in to a social networking site ("Would you like to publish this check-in to your Twitter account in exchange for a waiver of any overdraft fees you may incur for the next 30 days?").

In addition, both on the interior or exterior of the booth, environmental or seasonally appropriate displays may be generated. Snowflakes may be generated in the winter, flowers in the spring, leaves in the fall, and waterfalls or beaches in the summer. Holiday-related displays may also be desirable (images and/or sounds of fireworks around the time of the Fourth of July; images of hearts and the smell of chocolate on and around the time of Valentine's Day, etc.). In one embodiment of the invention, the opacity may be moved around the glass to form images, such as a moving waterfall or a forest (or, in one exemplary embodiment, a dynamic company logo). In a further embodiment, the user may designate certain dates as dates of interest and/or import. For instance, in an embodiment of the invention, the user may modify his or her stored user profile to indicate the user's birthday and wedding anniversary. On these dates, the interior glass may show general images (a wedding cake) or user-selected images (personal wedding photo uploaded by the user), text ("Happy Anniversary!") and/or any other appropriate display.

The interior and exterior displays may also be used to provide benefits to a customer whose card is not affiliated with the institution that owns and operates the ATM. Typically, under these circumstances, the user will be assessed a fee for completing a transaction at that machine. However, in an embodiment of the invention, such a user may be given the option to waive the fee if the user agrees to watch a brief video advertisement on the internal screen while completing the transaction. Additionally or alternatively, the fee may also be waived if the user agrees to display a promotion on the exterior of the booth while the transaction is in progress. In either or both exemplary embodiments, the non-institutional user's typical fee is waived, and he or she has assisted in the promotion of a particular company, product, etc.

Figure 5:
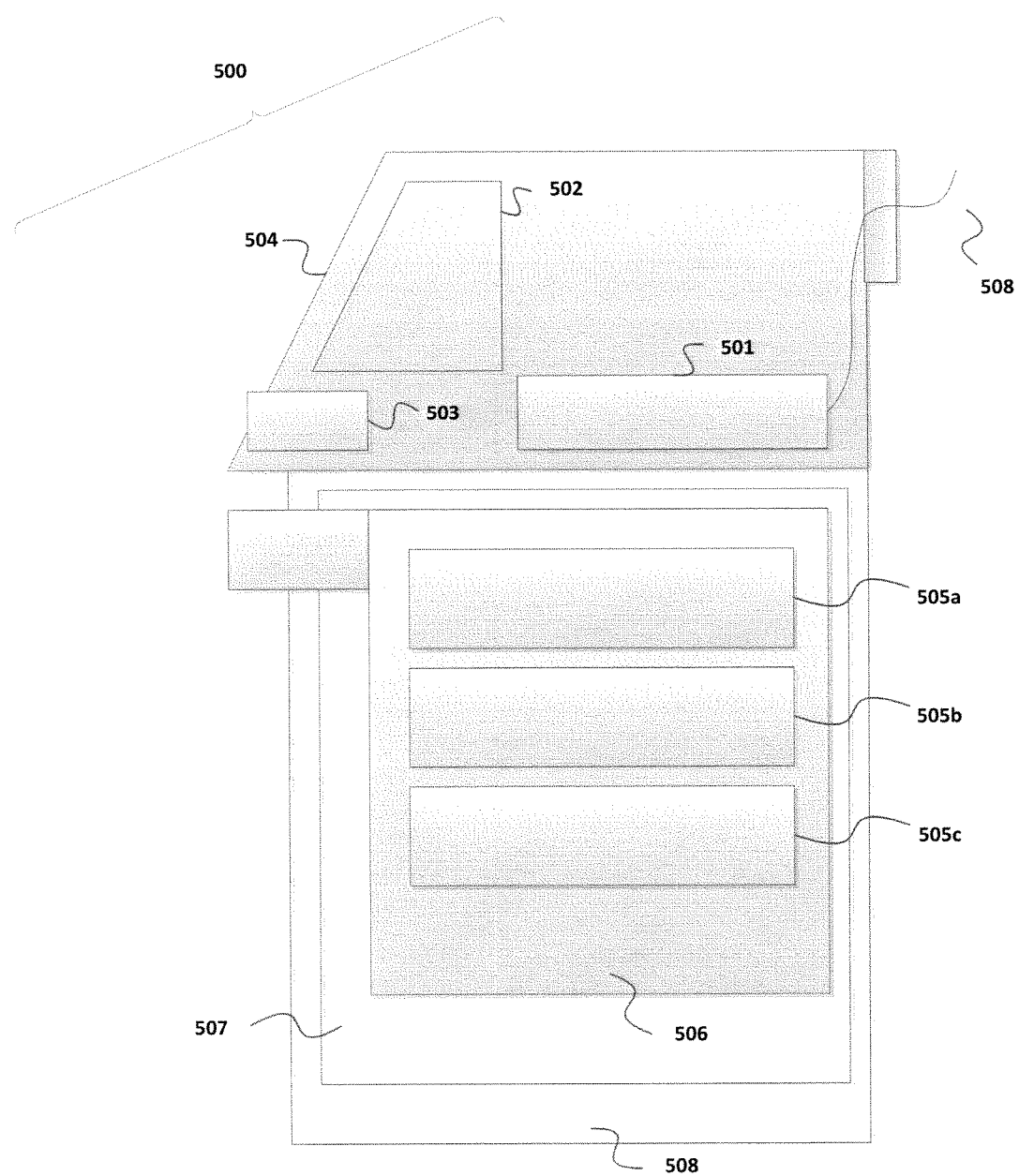
FIG. 5 is a diagram of an exemplary ATM.

FIG. 5 shows a basic block diagram of an ATM 500. It should be noted that this figure is intended to be exemplary. Central processing unit 501 ("CPU") controls the user interface and transaction devices, and the card reader 502 identifies the customer. In some embodiments of the invention, CPU 501 will also house a modem (not pictured) and a current application module (not pictured), which may be configured to determine when the electrical current should be deployed (or terminated from deployment) to the glass panel. An ATM Encrypting PIN Pad ("EPP") 503 allows the user to input information (for instance, a PIN number) and/or to respond to prompts or questions on screen 504. The ATM also employs cash cartridges 505a-c stored in cash handling mechanism 506. The cartridges 505a-c may further be housed in vault 507 and in additional housing 508. In embodiments of the invention, CPU 501 is operatively connected to the card reader 502 and is able to recognize and access user preferences. In some instances, this may be accomplished by CPU 501 recognition of identifying features on the card. In one embodiment, the CPU 501 may be operatively connected to a network (not pictured) via cable 508.

Figure 6:
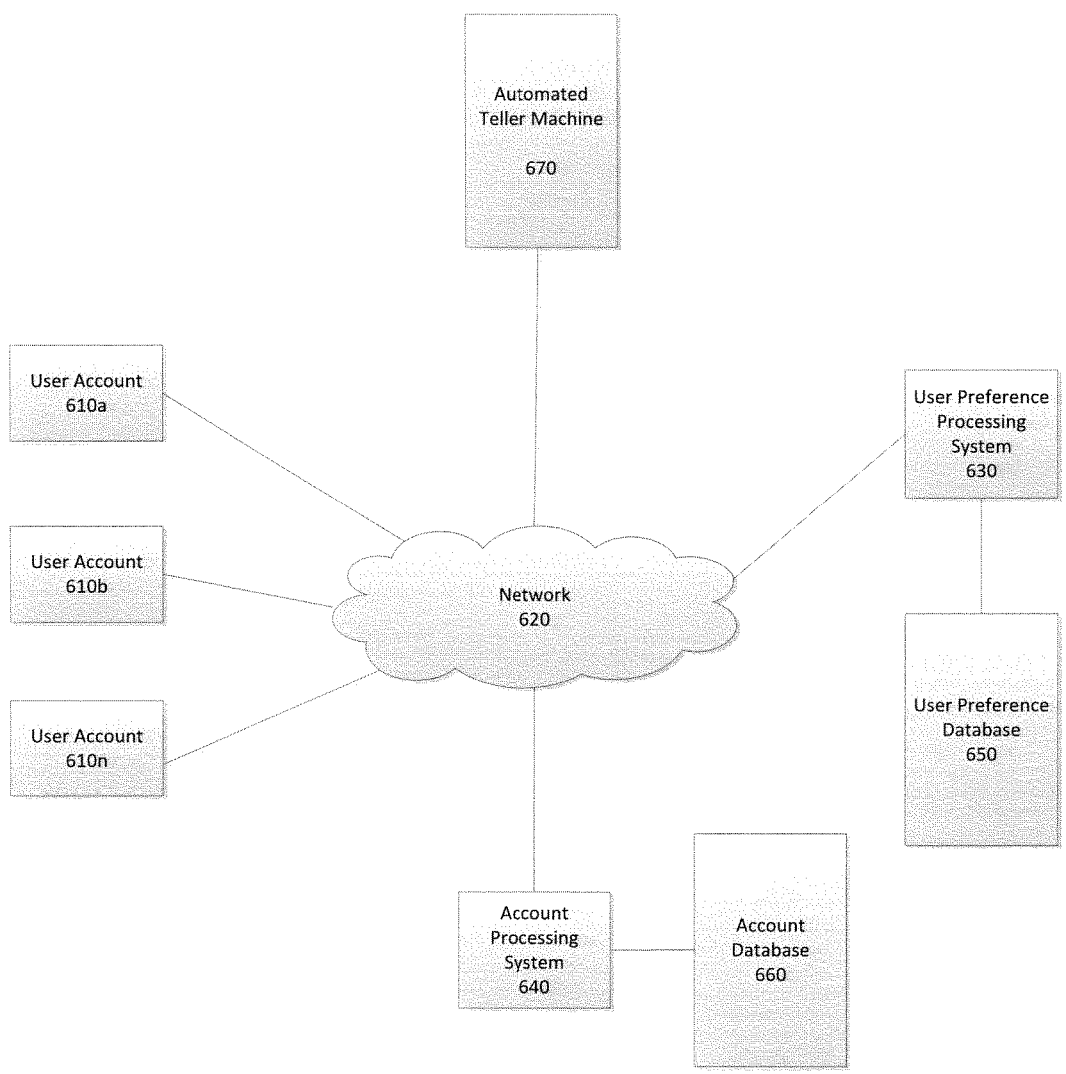
FIG. 6 is a block diagram illustrating an operating environment for a system in accordance with an embodiment of the invention.

FIG. 6 is a block diagram illustrating an operating environment in accordance with an embodiment of the invention. User accounts 610*a*, 610*b* . . . 610*n* may be connected over a network 620 to a user preference processing system 630 associated with or including a user preference database 650. Account processing system 640 is associated with or including account database 660 and further connected to other systems or modules through the network 620. Account processing system 640 may be operable to identify a user by the financial instrument swiped or tapped at the automated teller machine 670.

In an embodiment of the invention, the user account holders 610*a*, 610*b* . . . 610*n* may have accounts, such as, for example, accounts associated with a particular financial institution and generally managed by account processing system 640. In this embodiment of the invention, the user preference processing system 630, associated with the user preference database 650, operates as a way for the system to store and retrieve data associated with a customer's preferences for transactions. In embodiments of the invention, the user preference processing system 630 may display a user interface over the network 130 which offers various options to, and receiving input from, the user account holders 610*a*, 610*b* . . . 610*n*. Alternatively, the user account holders 610*a*, 610*b* . . . 610*n* may simply be provided with a phone number or email address associated with the user preference processing system 630 and may send preferences and/or responses to that phone number or email address. In such an embodiment, user account holders 610*a*, 610*b* . . . 610*n* could communicate with the diagnostic processing system via, for example, responding to prompts sent by text message (e.g., "If you would like to receive weather information during your next ATM transaction, text the zip code of the location for which you'd like to receive the weather report").

In an exemplary embodiment, the User A associated with User Account 610*a* accesses the account and uploads a particular music clip that the user would like to hear during an ATM transaction. This preference may be transmitted to user preference processing system 630, and the actual mp3 file may be stored in user preference database 650 for retrieval when the user is identified at automated teller machine 670. In another exemplary embodiment, User A may configure his or her account to display the weather in another city during a transaction at the automated teller machine 670.

The user account holders 610*a*, 610*b* . . . 610*n* may typically be individuals connecting over the network 620 to the user preference processing system 630 through the use of computing devices such as desktop, laptop, portable computing devices, or mobile devices, such as a smartphone or tablet device. The user accounts 610*a*, 610*b* . . . 610*n* may be associated with one or more financial accounts, which may themselves be further associated with a financial institution. The account processing system 640 may be responsible for generating, maintaining and identifying user accounts and authorizations, as well as associating user accounts with user preferences stored in user preference database 630. In embodiments of the invention, account processing system 640 may be linked directly with user preference database 650. In embodiments of the invention, it may also be preferred to combine the data in user preference database 650 and account database 660 into a single database accessible by user preference processing system 630, account processing system 640, or both.

Furthermore, the account processing system 640 may be in communication with the automated teller machine 670 via the network 620 to receive account information about user account holder 610*a*, 610*b* . . . 610*n* as the user initiates a transaction at automated teller machine 670. For example, if a user account holder 610*a*, 610*b* . . . 610*n* is retrieving cash from ATM 670, the account processing system 640 may notify the user of the user's current balance before the transaction is complete. In embodiments of the invention, basic information about a customer (sex, age, marital status, credit limit, city of residence) may be stored in account database 660 and utilized in targeted advertising at the ATM 670. For example, for an unmarried male user with a high balance suggesting large amounts of expendable income, it may be desirable to display advertisements for luxury goods (cars, designer suits, electronic devices) while the user is completing a transaction at automated teller machine 670. In an embodiment of the invention, it may be desirable to display advertisements for family-friendly vacation destinations to a married male user who makes frequent purchases at stores such as Baby Gap® and Toys"R"Us®.

The user preference processing system 630 and account processing system 640 may further include terminals or other equipment used to maintain and update records, and may connect over a network 620 for processing and subsequent access by the user accounts 610*a*, 610*b* . . . 610*n*. The network 620 is preferably the Internet, but may be or include other types of networks. The network 620 may include a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The account database 660 may be or include any database that stores data relating to the financial accounts associated with a particular user account 610*a*, 610*b* . . . 610*n*. As set forth above, account database 660 may typically include information and other data relevant to the user's financial account, but may also include other types of data as well; for instance, basic information about the user, whether there are multiple users on a single account, information relating to past or recent transactions, user spending patterns, and so on.

In embodiments of the invention, it should also be noted that these glass barriers may also be used to provide privacy even when an ATM is not being housed within them. For example, an area partially enclosed by opaque or clouded glass may provide the necessary privacy when stationed in a busy airport terminal. For instance, travelers may desire to change clothes quickly between flights and may not have time to locate and change in a restroom. In another example, these partitions may be desirable in other public places, such as shopping malls, amusement parks, swimming pools, etc., in particular for individuals or groups who might need privacy, e.g., breastfeeding mothers. These barriers would also provide immediate access to a non-public place to administer medications or make an private phone call, or to complete other tasks which may be undesirable to complete in public.

As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. A system for offering privacy to a user of an automated teller machine operated by a financial institution, the system comprising:

a first computer memory storing instructions, the first computer memory being associated with the financial institution and being further accessible and addressable over a network;

a database for storing user information, the database being accessible by the computer memory and accessible and addressable over the network; an automated teller machine, further comprising:

a second computer memory storing instructions, the second computer memory being associated with the automated teller machine and being accessible and addressable over the network;

an account access device for identifying the user upon detection of a user card and associating the user with financial account data stored on a host server, the account access device linked with a module operable to interrupt and generate flow of electrical current subsequent to detection of the user card;

at least one computer processor capable of accessing the first computer memory and executing the stored instructions, wherein the stored instructions comprise instructions to retrieve and evaluate the stored user information for the user identified by the account access device upon detection of the user card;

at least one glass panel positioned to at least partially obstruct a view of the automated teller machine, the at least one glass panel comprising:

an interior surface oriented toward the automated teller machine;

an exterior surface oriented away from the automated teller machine;

wherein the at least one computer processor is further operable to access the second computer memory and execute the stored instructions to retrieve settings indicating a desired level of transparency of the at least one glass panel upon detection of the card during the transaction and to customize an appearance of the at least one glass panel in accordance with the retrieved settings, by generating and delivering a change in electrical current to the at least one glass panel automatically in response to detection by the account access device of the user accessing the automated teller machine, the change in electrical current causing a decrease in transparency of the at least one glass panel and at least partially restricting the view of the automated teller machine through the at least one glass panel; and a high definition projection screen viewable on the interior surface of the at least one glass panel, the high definition projection screen presenting content to the user of the automated teller machine, wherein the content of the display is determined by the computer processor and is based at least in part on the stored user information and characteristics of the user card.

2. The system of claim 1, wherein the stored user information comprises at least one of the following:
the financial account data identified by the account access device;
data available from a stored user account, managed by the user and accessible over the network;
data available from an account profile, managed by the financial institution and accessible over the network; or
at least one previous transaction made by the user.

3. The system of claim 1, wherein both the interior surface and the exterior surface of the at least one glass panel are further operable as high definition projection screens.

4. The system of claim 3, wherein the content of the display on the at least one of the high definition projection screens includes at least one of the following: weather information, temperature information, a trivia question, information relating to the time of day or date, news alert, financial information, sports information, or an indication of whether the automated teller machine is currently in use.

5. The system of claim 1, wherein the change in electrical current decreases the transparency of the at least one glass panel to zero.

6. The system of claim 1, further comprising at least one of the following: a light source, at least one audio speaker, or at least one fan.

7. The system of claim 1, further comprising a communication link between the electrical current and at least one proximity sensor for detecting the presence of a user.

8. The system of claim 1, wherein the stored user information comprises a user preference for the transparency of the at least one glass panel during a transaction.

9. The system of claim 8, wherein the at least one computer processor is operable to generate and deliver an electrical charge that corresponds with the user preference for the transparency of the at least one glass panel during a transaction.

10. A method for offering privacy to a user of an automated teller machine operated by a financial institution, the automated teller machine including at least one glass panel positioned to at least partially obstruct a view of the automated teller machine, the at least one glass panel comprising an interior surface oriented toward the automated teller machine and an exterior surface oriented away from the automated teller machine, the method comprising:
storing user information in a database, the database being operatively connected to a computer memory storing instructions, the database further being accessible and addressable over a network;

identifying the user at the automated teller machine by using an account access device detecting a use of a financial instrument associated with the financial account data, wherein the financial instrument is associated with financial account data stored on a host server and the account access device is linked with a current application module operable to interrupt and generate flow of electrical current subsequent to detection of the financial instrument;

accessing the user information via a computer processor associated with the automated teller machine, the computer processor being further configured to execute the stored instructions on the computer memory to (i) retrieve settings indicating a desired level of transparency of the at least one glass panel upon detection of the financial instrument during the transaction and to customize an appearance of the at least one glass panel in accordance with the retrieved settings, retrieve and evaluate the stored user information for the user identified by detection of the use of the financial instrument, and (ii) deploy the current application module;

triggering a change in electrical current through the current application module, wherein the change in electrical current is made based at least in part on the detection of the financial instrument;

applying, at the command of the current application module, the change in electrical current to the at least one glass panel, the change in electrical current being operable to decrease the transparency of the at least one transparent glass panel;

evaluating the user information and the characteristics of the financial instrument in order to select content to direct to the user; and displaying the content on at least one high definition projection screen viewable only by the user of the automated teller machine on the interior surface of the at least one glass panel.

11. The method of claim 10, wherein the user information is based on at least one of the following:
the detected financial account data;
data available from a stored user account, managed by the user and accessible over the network;
data available from an account profile, managed by the financial institution and accessible over the network;
at least one previous transaction made by the user.

12. The method of claim 10, further comprising the step of displaying content on at least one of the interior surface of the at least one glass panel and the exterior surface of the at least one glass panel.

13. The method of claim 12, wherein both the interior surface and the exterior surface of the at least one glass panel are further operable as high definition projection screens, the high definition projection screen on the interior surface of the at least one glass panel and the high definition projection screen on the exterior surface of the at least one glass panel being capable of operating independently of each other.

14. The method of claim 13, wherein the content of the display on at least one of the high definition projection screens includes at least one of the following: weather information, temperature information, a trivia question, information relating to the time of day or date, news alert, financial information, sports information, or an indication of whether the automated teller machine is currently in use.

15. The method of claim 10, wherein the change in electrical current decreases the transparency of the at least one glass panel to zero.

16. The method of claim 10, further comprising at least one of the following steps:
- increasing the light surrounding the automated teller machine with at least one light source;
- detecting the presence of the user using at least one proximity sensor;
- playing a song or other sound effects using at least one audio speaker; or
- implementing at least one fan for disseminating a scent.

* * * * *